US012639894B2

(12) United States Patent (10) Patent No.: US 12,639,894 B2
Kairali et al. (45) Date of Patent: May 26, 2026

(54) CREDENTIALED VOLUMETRIC VIDEO

(71) Applicant: International Business Machines Corporation, Armonk, NY (US)

(72) Inventors: Sudheesh S. Kairali, Kozhikode (IN); Satyam Jakkula, Bengaluru (IN); Sarbajit K. Rakshit, Kolkata (IN); Sudhanshu Sekher Sar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 18/415,915

(22) Filed: Jan. 18, 2024

(65) Prior Publication Data

US 2025/0239020 A1 Jul. 24, 2025

(51) Int. Cl.
*G06T 19/00* (2011.01)
*G06F 21/31* (2013.01)
(Continued)

(52) U.S. Cl.
CPC .............. *G06T 19/00* (2013.01); *G06F 21/31* (2013.01); *G06N 3/094* (2023.01); *G06T 7/70* (2017.01); *G06T 15/08* (2013.01); *G06V 20/41* (2022.01); *G06V 20/50* (2022.01); *H04N 13/296* (2018.05); *G06T 2200/04* (2013.01); (Continued)

(58) Field of Classification Search
CPC ........ G06V 20/41; G06V 20/50; G06T 15/08; G06T 19/00; G06T 7/70; G06T 2207/30244; G06T 2200/04; G06T 2219/004; G06T 2207/30196; G06T 2207/10016; G06T 19/20; G06T 17/00; G06T 13/40; G06F 21/31; G06F 3/011; G06F 3/04815; G06F 3/04842; (Continued)

(56) References Cited

U.S. PATENT DOCUMENTS 11,089,281 B2 8/2021 Begeja
11,481,931 B2 10/2022 Beith
(Continued)

FOREIGN PATENT DOCUMENTS

WO 2019212872 A1 11/2019

OTHER PUBLICATIONS

"Canon and IBM Japan Form Joint Business Operation Utilizing Volumetric Video Technology to Promote the Visual and Performing Arts," Canon, Jul. 7, 2021, pages. https://sg.canon/en/consumer/form-joint-utilizing-volumetric-video-technology/news.
(Continued)

*Primary Examiner* — Xilin Guo
(74) *Attorney, Agent, or Firm* — Edward J. Wixted, III

(57) ABSTRACT

One or more computer processors capturing a volumetric video containing one or more objects. The one or more computer processors tag the one or more objects with a respective permission. The one or more computer processors responsive to a user interacting with the captured volumetric video, identify the user and one or more associated permissions. The one or more computer processors responsive to determining that the user does not have permission to view at least one object, conceal the at least one object. The one or more computer processors display the volumetric video to the user with the at least one concealed object.

20 Claims, 3 Drawing Sheets

(51) Int. Cl.

| | |
|---|---|
| *G06N 3/094* | (2023.01) |
| *G06T 7/70* | (2017.01) |
| *G06T 15/08* | (2011.01) |
| *G06V 20/40* | (2022.01) |
| *G06V 20/50* | (2022.01) |
| *H04N 13/296* | (2018.01) |

(52) U.S. Cl.
CPC ............... *G06T 2207/30196* (2013.01); *G06T 2207/30244* (2013.01); *G06T 2219/004* (2013.01)

(58) Field of Classification Search
CPC ........ G06F 18/24; G06N 3/045; G06N 3/094; H04N 13/296; H04N 19/597; H04N 21/816
See application file for complete search history.

(56) References Cited

U.S. PATENT DOCUMENTS

| | | | | |
|---|---|---|---|---|
| 2014/0013422 A1* | 1/2014 | Janus | .................... | G06F 21/32 726/19 |
| 2018/0336702 A1* | 11/2018 | Cricri | .................... | G10L 25/57 |
| 2019/0251722 A1 | 8/2019 | Ross | | |
| 2021/0383018 A1* | 12/2021 | Keskikangas | ....... | G06F 21/6209 |
| 2022/0329871 A1 | 10/2022 | Afalki Beni | | |

OTHER PUBLICATIONS

"Canon, Inc. and IBM Launch Collaboration in Entertainment and the Arts in Japan," IBM Newsroom, Jul. 15, 2021, 3 pages. https://newsroom.ibm.com/2021-07-15-Canon,-Inc-and-IBM-Launch-Collaboration-in-Entertainment-and-the-Arts-in-Japan.

Antunes, J., "Canon and IBM: using volumetric video to promote visual arts," Pro Video Coalition, Jul. 13, 2021, 10 pages. https://www.provideocoalition.com/canon-and-ibm-using-volumetric-video-to-promote-visual-arts/.

Cohen, A., "Welcome to the Netaverse, Where Brooklyn Nets Players Can Be Seen in a Whole New (3D) Light," Sports Business Journal, Feb. 3, 2022, 3 pages. https://www.sportsbusinessjournal.com/Daily/Issues/2022/02/03/Technology/welcome-to-the-netaverse-where-brooklyn-nets-players-can-be-seen-in-a-whole-new-3d-light.

Lee et al., "GROOT: A Real-time Streaming System of High-Fidelity Volumetric Videos," MobiCom '20, Sep. 2020, 14 pages.

Perkins, L., "The business benefits of volumetric video," BT Business, Jun. 17, 2021, 9 pages. https://business.bt.com/why-choose-bt/insights/the-future-is-now/transforming-industries-with-volumetric-video/.

Sivasamy et al., "VRCAuth: Continuous Authentication of Users in Virtual Reality Environment Using Head-Movement," Proceedings of the Fifth International Conference on Communication and Electronics Systems (ICCES 2020), pp. 518-523. https://ieeexplore.ieee.org/document/9137914.

Tang et al., "VVSec: Securing Volumetric Video Streaming via Benign Use of Adversarial Perturbation," Poster Session B3: Multimedia System and Middleware & Multimedia Telepresence and Virtual/Augmented Reality (MM '20), Oct. 2020, pp. 3614-3623.

* cited by examiner

100

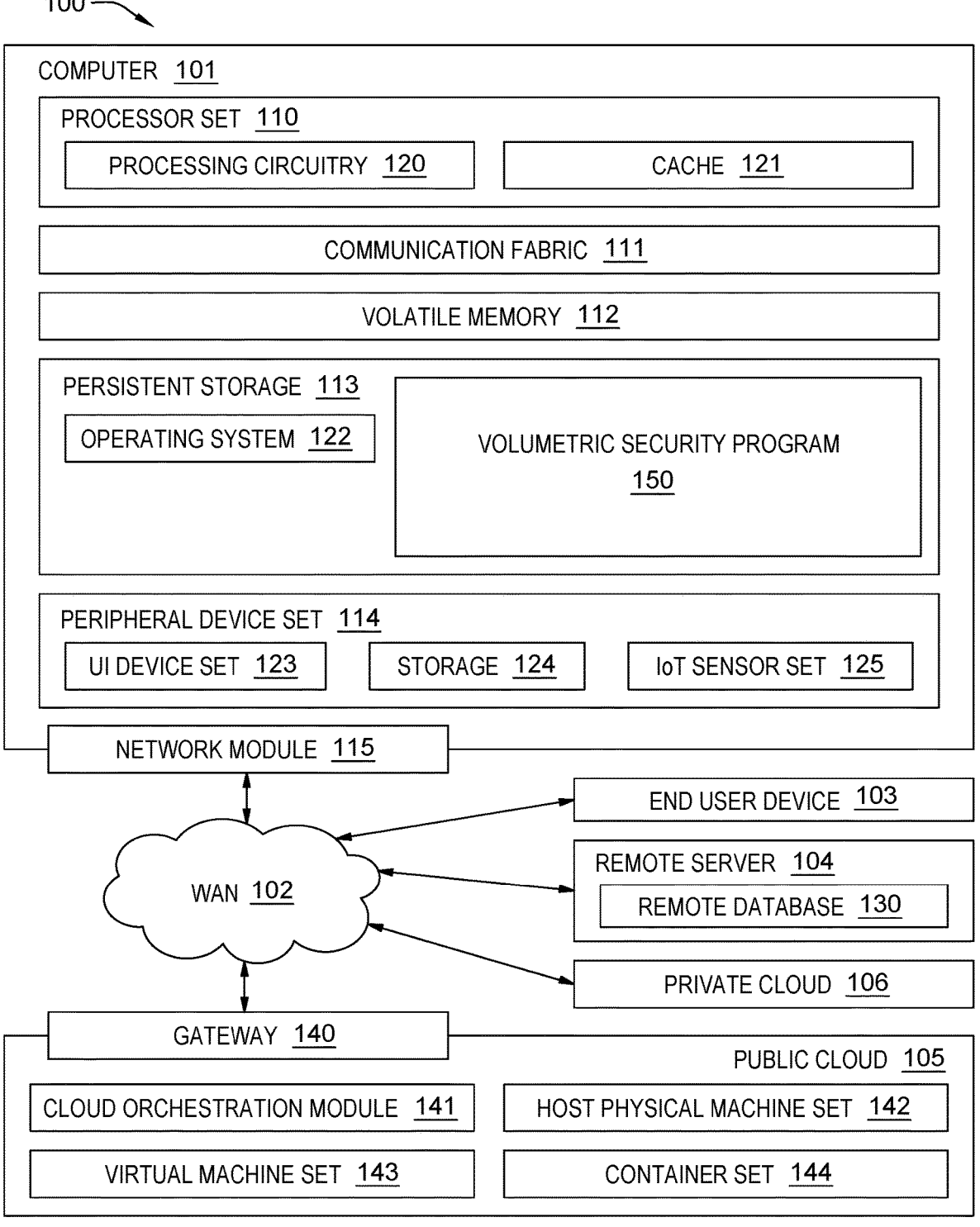

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122        VOLUMETRIC SECURITY PROGRAM 150

PERIPHERAL DEVICE SET 114

UI DEVICE SET 123        STORAGE 124        IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOST PHYSICAL MACHINE SET 142

VIRTUAL MACHINE SET 143        CONTAINER SET 144

FIG. 1

CREDENTIALED VOLUMETRIC VIDEO

BACKGROUND

The present invention relates generally to the field of volumetric video, and more particularly to credentialed volumetric video.

A volumetric video forms a visual representation of an object in three physical dimensions, as opposed to a planar image of traditional videos which simulate depth through a number of different visual effects. A volumetric video produces in an observer a visual experience of a material object in three-dimensional space. The perceived object displays characteristics similar to an actual material object by allowing the observer to view it from any direction and focus a view on a specific detail.

SUMMARY

Embodiments of the present invention disclose a computer-implemented method, a computer program product, and a system. The computer-implemented method includes one or more computer processers capturing a volumetric video containing one or more objects. The one or more computer processors tag the one or more objects with a respective permission. The one or more computer processors responsive to a user interacting with the captured volumetric video, identify the user and one or more associated permissions. The one or more computer processors responsive to determining that the user does not have permission to view at least one object, conceal the at least one object. The one or more computer processors display the volumetric video to the user with the at least one concealed object.

BRIEF DESCRIPTION OF THE DRAWINGS

FIG. 1 is a functional block diagram illustrating a computing environment, in accordance with an embodiment of the present invention;

DETAILED DESCRIPTION

Figure 2:
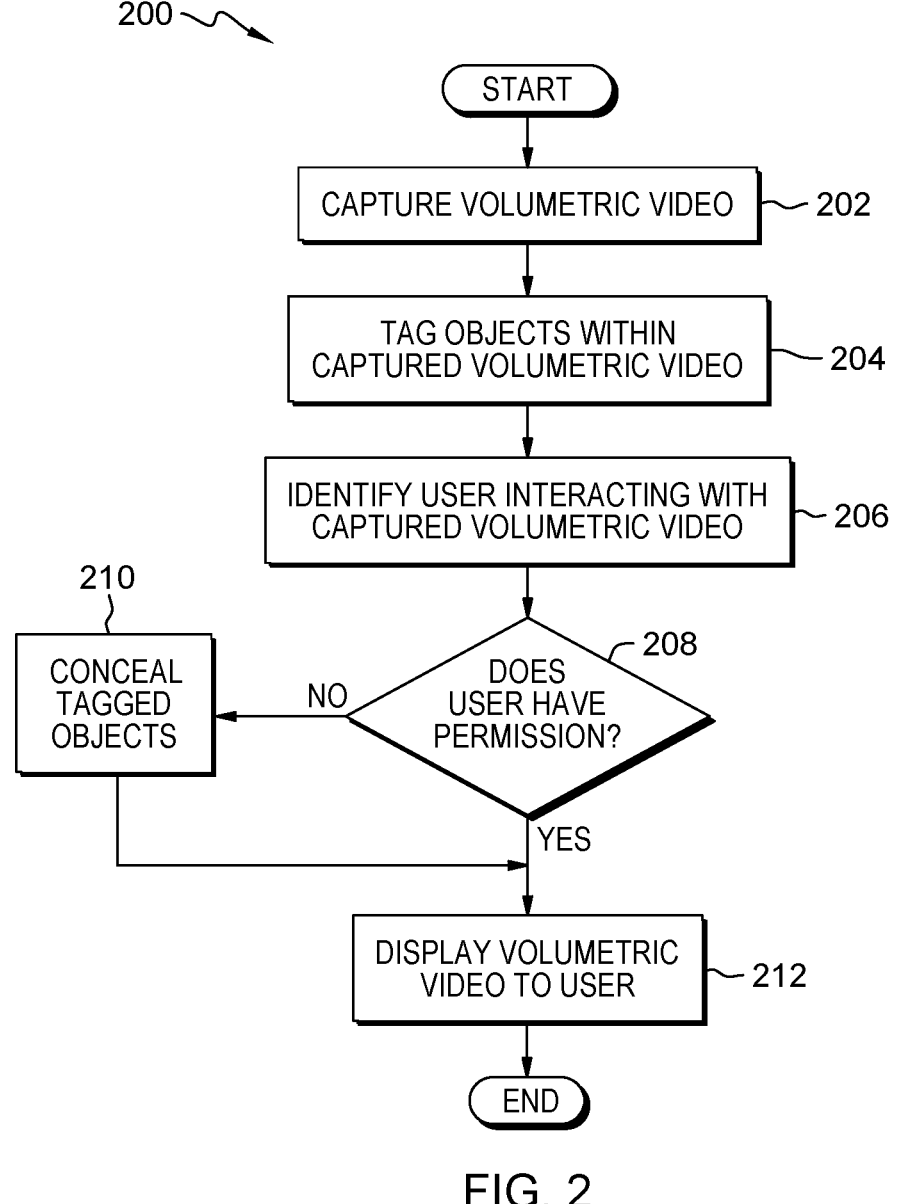
FIG. 2 is a flowchart depicting operational steps of a program, on a computer within the computing environment of FIG. 1, for credentialed volumetric video interaction management, in accordance with an embodiment of the present invention.
Figure 3:
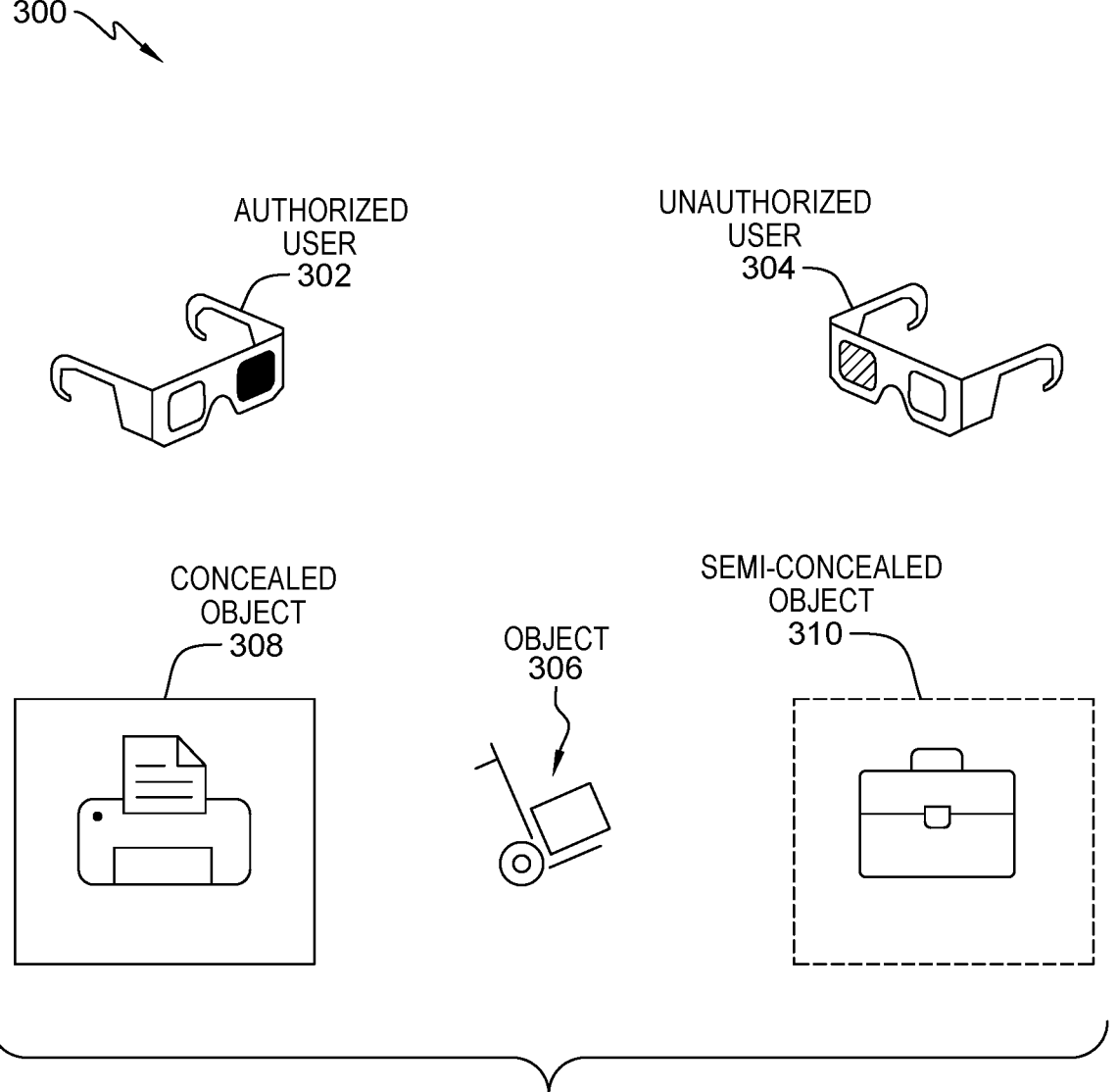
FIG. 3 is an exemplary illustration of the program within the computing environment of FIG. 1, in accordance with an embodiment of the present invention.

Volumetric video technology leverages cameras and advanced data processing to render three-dimensional (3D) images from a virtual space. Volumetric video allows for users to view comprised objects from any angle within that space, creating a visually immersive experience. Traditionally, users utilize a virtual reality (VR), or 3D display to view a rendered volumetric object from any perspective and while interacting with the volumetric video, users can navigate any direction, potentially viewing unauthorized objects or unauthorized environments. For example, a volumetric video is created for an industrial floor, where some rooms and/or objects are unauthorized for guests or low permissioned employees to view, however the volumetric video should remain viewable, without modification, by credentialed users. Traditionally, multiple volumetric videos are created for a specific permission or security level, leading to extensive computational costs (e.g., storage space, required processing power), especially if a plurality of different permissions exists in an organization. Traditionally, objects are removed or added dependent on permission level, resulting in a plurality of computationally expensive volumetric videos.

Embodiments of the present invention reduce computational resources of permissioned volumetric video systems by eliminating a need for multiple variations of captured volumetric video. Embodiments of the present invention eliminate said need through dynamic object concealment based on identified user permissions. Embodiments of the present invention allow for an injection of security rules for accessing volumetric video, where the volumetric video contains multi-camera feeds from a plurality of directions of one or more permissioned objects. Embodiments of the present invention manage the display and concealment of permissioned objects based on user permission, direction of user navigation, and user perspective.

Implementation of embodiments of the invention may take a variety of forms, and exemplary implementation details are discussed subsequently with reference to the Figures.

The present invention will now be described in detail with reference to the Figures.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as volumetric security program 150, hereinafter program 150. In addition to program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Volumetric security program 150 (i.e., program 150) is a program, a subprogram of a larger program, an application, a plurality of applications, or mobile application software, which functions to manage credentialed volumetric video interactions. In an embodiment, program 150 is implemented as a module managing one or more cameras utilized in a volumetric video capture process. In this embodiment, all captured video is processed through program 150 before a post-processing stage. In a further embodiment, program 150 tags all objects within captured video before post-processing. In another embodiment, program 150 is implemented as a module between a volumetric video repository and a display utilized to view the volumetric video. In various embodiments, program 150 may implement the following steps: capture a volumetric video containing one or more objects; tag the one or more objects with a respective permission; responsive to a user interacting with the captured volumetric video, identify the user and one or more associated permissions; responsive to determining that the user does not have permission to view at least one object, conceal the at least one object; and display the volumetric video to the user with the at least one concealed object. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over WAN 102. In various embodiments, client versions of program 150 resides on any other computing device (not depicted) within computing environment 100. Program 150 is depicted and described in further detail with respect to FIG. 2.

In an embodiment, program 150 includes a generative adversarial network (GAN) comprising two adversarial neural networks (i.e., generator and discriminator) trained utilizing unsupervised and supervised methods with images representative of intended objects, associated environments, and styles associated with varied permissions (e.g., varying degrees of obfuscation or concealment). In another embodiment, program 150 initializes a generator utilizing randomized input data sampled from a predefined latent space (e.g. a multivariate normal distribution), thereafter, candidates synthesized by the generator are evaluated by the discriminator. In this embodiment, program 150 applies backpropagation to both networks so that the generator produces better images or videos, while the discriminator becomes more skilled at flagging synthetic images. In the depicted embodiment, the generator is a deconvolutional neural network and the discriminator is a convolutional neural network.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

FIG. 2 depicts flowchart 200 illustrating operational steps of program 150 for credentialed volumetric video interaction management, in accordance with an embodiment of the present invention.

Program 150 captures a volumetric video (step 202). In an embodiment, program 150 initiates responsive to a request for a volumetric video capture. In another embodiment, program 150 initiates responsive to a provided or retrieved volumetric video. In yet another embodiment, program 150 initiates responsive to a user interacting (e.g., playing; navigating; accessing; changing user viewing direction, angle, perspective, or viewed object) with a credentialed volumetric video (i.e., a video that contains one or more objects with associated permissions). In an embodiment, program 150 identifies each camera in a volumetric video capture environment. In a further embodiment, program 150 identifies a respective position of each identified camera in relation to each other camera in the environment. In an embodiment, program 150 programmatically adjusts and controls each camera to capture and identify each object within the target environment. For example, program 150 utilizes one or more automated devices to change the respective position and/or one or more capture angles of the one or more identified cameras. In this embodiment, program 150 utilizes a video capture stream or feed from the identified cameras to construct a volumetric video in which each object in the environment (e.g., warehouse, factory, sports event, control room) is visually represented in 3D. In an embodiment, program 150 programmatically configures the identified cameras to focus (e.g., increased camera attention or camera recording time) on one or more comprised objects based on a respective permission, credential, or security score (i.e., level) associated with the one or more comprised objects.

Program 150 tags objects within the captured volumetric video (step 204). In an embodiment, a user provides program 150 a set of credentials, permissions, and/or authorized users along with permissioned objects within the target environment. In an embodiment, program 150 utilizes computer vision techniques to identify one or more objects captured within the volumetric video. In another embodiment, program 150 identifies one or more objects, in real-time, as the identified cameras are capturing video. In yet another embodiment, program 150 utilizes machine learning to automatically tag objects based on a calculated security score, wherein the security score is derived from regulatory requirements, organizational requirements (e.g., business imperative), etc., associated with an identified object. In another embodiment, program 150 tags one or more identified objects with a physical or virtual quick-response (QR) code that contains a permission or security level associated with the respective object. In another embodiment, responsive to program 150 identifying an object and determining an associated security level, program 150 creates and maintains a virtual duplicate of the identified object. In an embodiment, program 150 receives or retrieves a set of expected permissions (e.g., employment role, business requirements, event purpose, etc.). In a further embodiment, program 150 associates one or more identified objects with one or more permissions in the set of expected permissions. For example, program 150 associates factory equipment (i.e., objects) with permissions associated with floor workers and program 150 associates financial objects with permissions associated with management employees.

Program 150 identifies a user interacting with captured volumetric video (step 206). In an embodiment, responsive to a user viewing, playing, interacting with, and/or initiating the volumetric video, program 150 identifies the user and associated permissions (e.g., security clearance, security level, job title, etc.). In this embodiment, program 150 prevents unauthenticated users from viewing the volumetric video. In an embodiment, program 150 collects one or more biometrics (e.g., retinal, fingerprint, voice) to identify the user. For example, the user utilizes a retinal scan to authenticate. In another example, program 150 receives a user identification through a provided or identified security badge. In an embodiment, while any user is navigating the volumetric video, program 150 will receive a user credential, and accordingly, adjust the volumetric video as described in step 210. In an embodiment, program 150 bootstraps an unidentified user responsive to program 150 identifying one or more user characteristics such as predicted position (e.g., employment role, employment category, predicted task). For example, program 150 cannot identify an exemplary user, however, program 150 identifies that an attire of the exemplary user is suited for a specific industrial task, thus program 150 bootstraps the exemplary user with a default set of permissions associated with an employment role that typically is assigned the industrial task.

If the identified user does not have permission, ("no" branch, decision block 208), then program 150 conceals the tagged objects (step 210). In an embodiment, program 150 compares the identified user and an associated permission with a respective permission of each identified object in the captured volumetric video. In an embodiment, program 150 conceals, obfuscates, modifies, and/or adjusts every object that has a security level or permission that is greater or higher (i.e., requiring a higher level or another permission that permits the object) than the permission associated with the user. For example, the identified user does not have sufficient credentials to view three out of five objects identified in the captured volumetric video, thus program 150 creates a 3D mask that shields the unauthorized objects from the user. In other embodiments, program 150 dynamically enables a virtual fence or wall around a permissioned object that prevents the unauthorized user from viewing said object at any angle or perspective within the volumetric video. In an embodiment, program 150 utilizes the identified objects and respective relative positioning to create a closed loop contour of a virtual wall to cover said object from unauthorized users. In another embodiment, program 150 adjusts a level of transparency associated with a concealed object based on a level of permission of one or more identified users. For example, the level of transparency can range from transparent (e.g., unrestrictive permissions) to opaque (e.g., restrictive permissions). In an embodiment, each time the user views an object, program 150 compares the user permission with the object permission and conceals accordingly.

In an embodiment, program 150 creates a generative adversarial network comprising a generator model and a discriminator model. In this embodiment, program 150 trains said models utilizing supervised methods with captured volumetric video and images (e.g., virtual walls) representative of an intended image style. In an embodiment, a user provides one or more sample volumetric video objects associated with one or more varying levels of privacy or obfuscation associated with a plurality of permissions. In the depicted embodiment, the generator is a deconvolutional neural network and the discriminator is a convolutional neural network. In this embodiment, program 150 creates an electronic representation of an object concealment considering a broad range of styles, user perspectives, and object viewing angles. In another embodiment, program 150 utilizes a live stream perspective of a user as a basis for generation. In an embodiment, program 150 generates object representations based on one or more security preferences and privacy parameters. In this embodiment, program 150 generates objects or virtual walls (i.e., concealment) ranging from highly obfuscated or genericized (e.g., all details, except general object shape, are removed) objects to photo-realistic representations of the object.

If the identified user does have permission, ("yes" ["no"] branch, decision block 208), then program 150 displays volumetric video to user (step 212). In an embodiment, program 150 determines that the user permission or a level of security is necessary to view all objects within the captured volumetric video. In this embodiment, program 150 displays or transmits the captured volumetric video to the user without any modification or alteration.

Program 150 displays volumetric video to user (step 212). In an embodiment, responsive to determining one or more permissions of the user and concealing any unauthorized or unpermitted objects, program 150 displays the captured volumetric video to the user. In this embodiment, program 150 displays each authorized object in 3D from the perspective of the user. In a further embodiment, program 150 allows the user to interact with the captured volumetric video according to identified user permissions. For example, users with unrestricted access are able to interact with the volumetric video with six degrees of freedom, including X, Y, and Z axes, in addition to pitch, yaw, and roll. In an embodiment, program 150 presents and/or adjusts the tagged objects dependent on one or more capabilities (e.g., display size, resolution) of an associated video application or computing device. In various embodiments, program 150 displays the associated permission in a proximity (e.g., adjacent) to an object. For example, as the user navigates the video, program 150 dynamically overlays a respective permission or security level for each object the user encounters. In an embodiment, program 150 retrieves, queries, prompts, or determines one or more user preferences or settings detailing user presentation settings such as color preferences, viewing distance, etc.

FIG. 3 depicts example 300, in accordance with an illustrative embodiment of the present invention. Example 300 contains authorized user 302 with an unrestricted permission, unauthorized user 304 with a restricted permission, object 306 that is visible to all users, concealed object 308 that is only visible to authorized users, and semi-concealed object 310 that is concealed to unauthorized users and unmodified to authorized users. In example 300, program 150 is implemented as a module between a volumetric video source and one or more display devices associated with the users. Both authorized user 302 and unauthorized user 304 initiate a respective viewing of a captured volumetric video. Before video is displayed, program 150 identifies both users and respective permissions. Here, program 150 identifies authorized user 302 and retrieves unrestrictive permissions allowing authorized user 302 to view all objects without modification or concealment. Program 150 identifies unauthorized user 304 and retrieves restrictive permissions restricting unauthorized user 302 to view object 306 without modification, semi-concealed object 310 with a determined level of transparency, and concealed object 308 with a generated virtual wall. Program 150 responsively displays, without modification, the captured volumetric video to authorized user 302. Program 150 generates a virtual wall around concealed object 308 that restricts unauthorized user 304 from viewing or receiving information derived from said object. Program 150 adjusts a level of transparency associated with semi-concealed object 310, allowing unauthorized user 304 to view semi-concealed object 310 with reduced details. Here, program 150 adjusts the level of transparency based on a level of security associated with unauthorized user 304.

What is claimed is:

1. A computer-implemented method comprising:

capturing, by one or more computer processors, a volumetric video containing one or more objects;

tagging, by one or more computer processors, the one or more objects with a respective permission;

responsive to a user interacting with the volumetric video, identifying, by one or more computer processors, the user and one or more associated permissions;

responsive to determining that the user does not have permission to view at least one object, concealing, by one or more computer processors, the at least one object with a three dimensional mask surrounding the at least one object within the volumetric video; and displaying, by one or more computer processors, the volumetric video to the user with the at least one concealed object.

2. The computer-implemented method of claim 1, wherein concealing the at least one object comprises:

generating, by one or more computer processors, a contoured virtual wall surrounding the at least one object.

3. The computer-implemented method of claim 2, further comprising:

creating, by one or more computer processors, a generative adversarial network comprising a generator model and a discriminator model; and training, by one or more computer processors, the generator model and the discriminator model utilizing one or more supervised methods with the volumetric video and one or more sample volumetric objects associated with one or more varying levels of obfuscation.

4. The computer-implemented method of claim 1, wherein capturing the volumetric video containing the one or more objects comprises:

identifying, by one or more computer processors, one or more cameras in a volumetric video capture environment;

identifying, by one or more computer processors, a respective position of each identified camera in the volumetric video capture environment; and adjusting, by one or more computer processors, the one or more cameras to capture the one or more objects within the volumetric video capture environment.

5. The computer-implemented method of claim 4, wherein adjusting the one or more cameras to capture the one or more objects within the volumetric video capture environment comprises:

changing, by one or more computer processors, the respective position of the one or more cameras utilizing one or more automated devices.

6. The computer-implemented method of claim 1, further comprising:

responsive to an unidentified user interacting with the volumetric video, identifying, by one or more computer processors, one or more user characteristics.

7. The computer-implemented method of claim 6, further comprising:

predicting, by one or more computer processors, a task based on the one or more user characteristics; and bootstrapping, by one or more computer processors, a default permission set based on the predicted task.

8. A computer program product comprising:

one or more computer readable tangible storage media; and program instructions stored on the one or more computer readable tangible storage media to perform operations comprising:

capturing a volumetric video containing one or more objects;

tagging the one or more objects with a respective permission;

responsive to a user interacting with the volumetric video, identifying the user and one or more associated permissions;

responsive to determining that the user does not have permission to view at least one object, concealing the at least one object with a three dimensional mask surrounding the at least one object within the volumetric video; and displaying the volumetric video to the user with the at least one concealed object.

9. The computer program product of claim 8, wherein the concealing the at least one object comprises:

generating a contoured virtual wall surrounding the at least one object.

10. The computer program product of claim 9, wherein the operations further comprise:

creating a generative adversarial network comprising a generator model and a discriminator model; and training the generator model and the discriminator model utilizing one or more supervised methods with the volumetric video and one or more sample volumetric objects associated with one or more varying levels of obfuscation.

11. The computer program product of claim 8, wherein the capturing the volumetric video containing the one or more objects comprises:

identifying one or more cameras in a volumetric video capture environment;

identifying a respective position of each identified camera in the volumetric video capture environment; and adjusting the one or more cameras to capture the one or more objects within the volumetric video capture environment.

12. The computer program product of claim 11, wherein the adjusting the one or more cameras to capture the one or more objects within the volumetric video capture environment comprises:

changing the respective position of the one or more cameras utilizing one or more automated devices.

13. The computer program product of claim 8, wherein the operations further comprise:

responsive to an unidentified user interacting with the volumetric video, identifying one or more user characteristics.

14. The computer program product of claim 13, wherein the operations further comprise the steps of:

predicting a task based on the one or more user characteristics; and bootstrapping a default permission set based on the predicted task.

15. A computer system comprising:

a processor set;

one or more computer readable storage media; and program instructions stored on the one or more computer readable storage media to cause the processor set to perform operations comprising:

capturing a volumetric video containing one or more objects;

tagging the one or more objects with a respective permission;

responsive to a user interacting with the volumetric video, identifying the user and one or more associated permissions;

13 responsive to determining that the user does not have permission to view at least one object, concealing the at least one object with a three dimensional mask surrounding the at least one object within the volumetric video; and displaying the volumetric video to the user with the at least one concealed object.

16. The computer system of claim 15, wherein the concealing the at least one object comprises:

generating a contoured virtual wall surrounding the at least one object.

17. The computer system of claim 16, wherein the operations further comprise:

creating a generative adversarial network comprising a generator model and a discriminator model; and training the generator model and the discriminator model utilizing one or more supervised methods with the volumetric video and one or more sample volumetric objects associated with one or more varying levels of obfuscation.

18. The computer system of claim 15, wherein the capturing the volumetric video containing the one or more objects comprises:

identifying one or more cameras in a volumetric video capture environment;

identifying a respective position of each identified camera in the volumetric video capture environment; and adjusting the one or more cameras to capture the one or more objects within the volumetric video capture environment.

19. The computer system of claim 18, wherein the adjusting the one or more cameras to capture the one or more objects within the volumetric video capture environment comprises:

changing the respective position of the one or more cameras utilizing one or more automated devices.

20. The computer system of claim 15, wherein the operations further comprise:

responsive to an unidentified user interacting with the volumetric video, identifying one or more user characteristics.

* * * * *